(12) United States Patent
Evans

(10) Patent No.: US 11,477,562 B2
(45) Date of Patent: Oct. 18, 2022

(54) WIRELESS HEADPHONE CHARGING SYSTEM

(71) Applicant: Doctor Goggle SEZC, George Town (KY)

(72) Inventor: Allan Evans, George Town (KY)

(73) Assignee: Ballast Technology LLC, Tallahassee, FL (US)

( * ) Notice: Subject to any disclaimer, the term of this patent is extended or adjusted under 35 U.S.C. 154(b) by 238 days.

(21) Appl. No.: 17/012,943

(22) Filed: Sep. 4, 2020

(65) Prior Publication Data

US 2021/0329363 A1   Oct. 21, 2021

Related U.S. Application Data

(60) Provisional application No. 63/012,108, filed on Apr. 18, 2020.

(51) Int. Cl.
*H02J 7/00* (2006.01)
*H04R 1/10* (2006.01)

(52) U.S. Cl.
CPC .......... *H04R 1/1025* (2013.01); *H02J 7/0034* (2013.01); *H02J 7/0045* (2013.01); *H02J 7/00712* (2020.01); *H04R 1/1066* (2013.01)

(58) Field of Classification Search
CPC .................................................. H02J 7/00712
(Continued)

(56) References Cited

U.S. PATENT DOCUMENTS

| 4,588,867 A | 5/1986 | Konomi |
| D318,473 S | 7/1991 | Miyashita et al. |

(Continued)

FOREIGN PATENT DOCUMENTS

| CN | 204836508 U | 12/2015 |
| CN | 204859502 U | 12/2015 |

(Continued)

OTHER PUBLICATIONS

International Search Report and Written Opinion from PCT App. No. PCT/US 2021/026779 (filed Apr. 12, 2021), dated Jul. 15, 2021.
(Continued)

*Primary Examiner* — Yalkew Fantu
(74) *Attorney, Agent, or Firm* — Jacobsen IP Law; Krista S. Jacobsen

(57) ABSTRACT

Disclosed herein are battery-free charging systems for wireless headphones that have at least one proprietary electrical contact provided to charge an on-board power source of the wireless headphone. The battery-free charging system comprises a cable having a first end and a second end, a headphone socket coupled to the first end of the cable, a connector coupled to the second end of the cable, the connector for connecting the battery-free charging system to an external power source, and circuitry coupled to the headphone socket and to the connector. The headphone socket is configured to receive the wireless headphone, to couple the at least one proprietary electrical contact to the external power source, and to allow continued use of the wireless headphone while charging. The circuitry is configured to detect an orientation of the wireless headphone within the headphone socket and provide a charging signal appropriate for the detected orientation.

20 Claims, 13 Drawing Sheets

(58) Field of Classification Search
USPC .......................................................... 320/114
See application file for complete search history.

(56) References Cited

U.S. PATENT DOCUMENTS

| | | | |
|---|---|---|---|
| D337,589 S | 7/1993 | Wada | |
| D340,932 S | 11/1993 | Yan | |
| D431,553 S | 10/2000 | Suzuki | |
| D558,735 S | 1/2008 | Carr et al. | |
| D582,389 S | 12/2008 | Bose et al. | |
| D582,889 S | 12/2008 | Bose et al. | |
| D584,284 S | 1/2009 | Carr et al. | |
| 7,548,040 B2 | 6/2009 | Lee et al. | |
| D622,265 S | 8/2010 | Rye | |
| D641,737 S | 7/2011 | Krauss et al. | |
| 8,009,853 B2 | 8/2011 | Ito et al. | |
| 8,073,181 B2 | 12/2011 | Bakalos et al. | |
| D678,868 S | 3/2013 | Feng et al. | |
| D686,191 S | 7/2013 | Schaal et al. | |
| D694,220 S | 11/2013 | Lee et al. | |
| D695,265 S | 12/2013 | Schaal et al. | |
| D695,267 S | 12/2013 | Schaal et al. | |
| D707,652 S | 6/2014 | Brunner et al. | |
| 2004/0137968 A1 | 7/2004 | Schwald | |
| 2005/0254778 A1 | 11/2005 | Pettersen et al. | |
| 2009/0238395 A1 | 9/2009 | Jubelirer et al. | |
| 2010/0320961 A1 | 12/2010 | Castillo et al. | |
| 2011/0286615 A1 | 11/2011 | Olodort et al. | |
| 2014/0205108 A1 | 7/2014 | Triato | |
| 2015/0215695 A1 | 7/2015 | He et al. | |
| 2015/0245123 A1* | 8/2015 | Uchida | H04R 19/005 381/162 |
| 2016/0073188 A1 | 3/2016 | Lindén et al. | |
| 2016/0112788 A1 | 4/2016 | Huang | |
| 2016/0134961 A1 | 5/2016 | Shaffer | |
| 2016/0219356 A1 | 7/2016 | Cheng | |
| 2017/0093079 A1 | 3/2017 | Wagman et al. | |
| 2017/0094394 A1 | 3/2017 | McPeak et al. | |
| 2017/0094397 A1 | 3/2017 | Wagman et al. | |
| 2017/0105679 A1 | 4/2017 | Gil | |
| 2017/0134845 A1* | 5/2017 | Milam | H04R 1/1058 |
| 2017/0195770 A1* | 7/2017 | Cheney | H04R 1/1016 |
| 2017/0264991 A1 | 9/2017 | Horst et al. | |
| 2018/0083468 A1 | 3/2018 | Dennis | |
| 2018/0109864 A1* | 4/2018 | Yamamoto | H04R 1/1041 |

FOREIGN PATENT DOCUMENTS

| | | |
|---|---|---|
| CN | 207269259 U | 4/2018 |
| CN | 209572136 U | 11/2019 |
| CN | 209731514 U | 12/2019 |
| KR | 20180039288 A | 4/2018 |

OTHER PUBLICATIONS

Air.Wear Indiegogo pages (Jan. 24, 2019).
AirPods Charging Case Replacement—Jodno 110mAh Power Bank AirPods Neck Strap, Charging & Listening 2 in 1 Anti-Lost Enhancing Battery Life Compatible with Apple AirPods 1&2 (available at least as of Aug. 5, 2020).
Diogo Costa, "Air Wear lets you charge your Air Pods while you use them" (Jan. 31, 2019).
Stealth 600 For PS4/PS4 Pro—Charging The Headset (Aug. 30, 2017).
USB Dual Charging Cable for HBQ i7 i7s Bluetooth Headset 20CM Power Charger Cable,I7S and I7 Earbuds USB Charging Cable (available at least as of Aug. 5, 2020).
USB Wireless Bluetooth Headset Charging Cable Charger Durable Flexible Windless Cables For Xiaomi Airdots Youth/Redmi Airdots (available at least by Aug. 5, 2020).

* cited by examiner

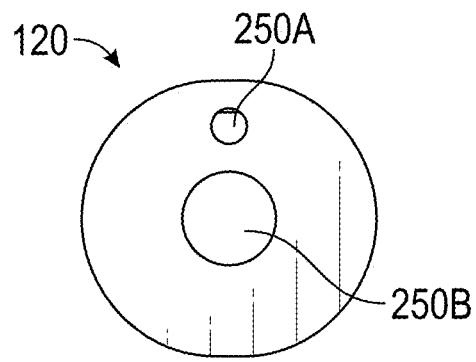 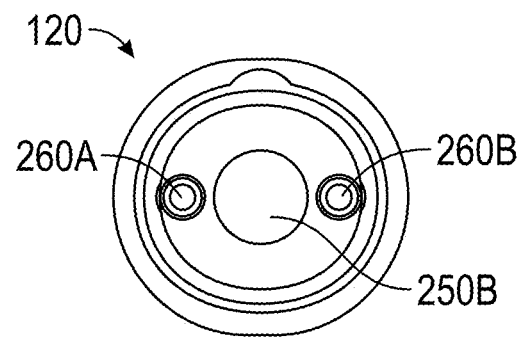
FIG. 5D    FIG. 5E
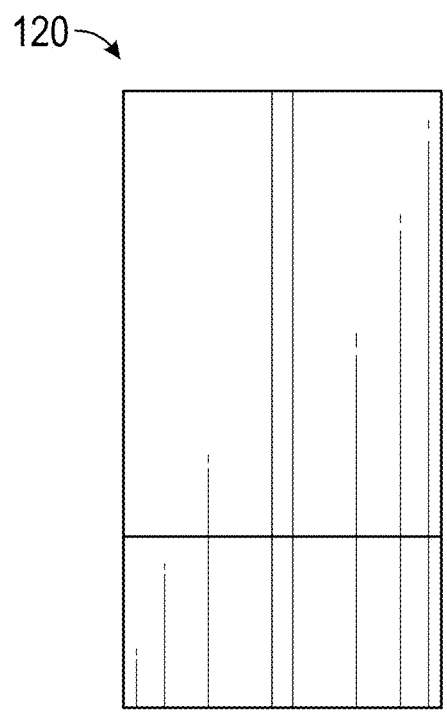
FIG. 5F

WIRELESS HEADPHONE CHARGING SYSTEM

CROSS-REFERENCE TO RELATED APPLICATIONS

This application claims the benefit of, and hereby incorporates by reference in its entirety for all purposes, U.S. provisional application No. 63/012,108, entitled "WIRELESS HEADPHONE CHARGING SYSTEM" and filed Apr. 18, 2020.

BACKGROUND

Wireless headphones (which can also be referred to as earphones, headsets, earbuds, personal speakers, microphones, etc.) have become popular and are now in widespread use with electronic devices such as mobile phones, tablets, and laptop and desktop computers. These wireless headphones generally fall into two categories: in-ear or over-the-ear. Some examples of over-the-ear wireless headphones include Beats By Dre—Beats Studio Wireless, Bose Quiet Comfort, and Sony WH-1000XM3. Some examples of in-ear wireless headphones include Apple AirPods, Beats Powerbeats Pro (which have ear hooks), Samsung Galaxy Buds+, and the Bose SoundSport headphones.

Wireless headphones transmit and/or receive signals (e.g., audio signals, control signals, et.) from a wirelessly connected external device (e.g., via Bluetooth or another wireless protocol). Because they are wireless, wireless headphones typically include an integrated, rechargeable on-board power source (e.g., a battery) that must be recharged periodically. Because wireless headphones are typically small, especially if they are in-ear headphones, their power sources may also be relatively small and may require recharging relatively frequently (e.g., more frequently than the smart phone or other device with which they are being used). Some wireless headphones (e.g., over-the-ear headphones) rely on the use of a standardized connector (e.g., mini- or micro-USB) to recharge the headphones' on-board batteries. Such standardized connectors help to ensure that the charging signal provided to the wireless headphones has the correct characteristics (e.g., polarity and voltage) to prevent damage to the on-board battery (or batteries) while the headphones recharge.

But standardized connectors, such as micro-USB, are physically large, especially relative to the sizes of most in-ear headphones. Consequently, some manufacturers of wireless headphones (e.g., in-ear wireless headphones) implement proprietary electrical contacts for recharging. Because these electrical contacts do not rely on the use of a standardized connector for charging, however, users often need to insert the wireless headphones into a specially-designed charging case to charge them. The charging case ensures that a charging signal with the correct characteristics (e.g., polarity and voltage) is provided to the wireless headphones to recharge the on-board battery (or batteries). As a result of needing to be inserted into a charging case for recharging, however, these wireless headphones cannot be used while recharging, which can be inconvenient for users.

Thus, there is an ongoing need for improved wireless headphone charging systems.

SUMMARY

This summary represents non-limiting embodiments of the disclosure.

Disclosed herein are embodiments of a battery-free charging system for a wireless headphone that has at least one proprietary electrical contact provided to charge an on-board power source of the wireless headphone. In some such embodiments, the battery-free charging system comprises a cable having a first end and a second end, a headphone socket coupled to the first end of the cable, a connector coupled to the second end of the cable, the connector for connecting the battery-free charging system to an external power source, and circuitry coupled to the headphone socket and to the connector. In some embodiments, the headphone socket is configured to receive the wireless headphone, to couple the at least one proprietary electrical contact to the external power source, and to allow continued use of the wireless headphone while charging. In some embodiments, the circuitry is configured to detect an orientation of the wireless headphone within the headphone socket, and in response to detecting that the orientation of the wireless headphone within the headphone socket is a first orientation, provide a charging signal having a first characteristic, and in response to detecting that the orientation of the wireless headphone within the headphone socket is a second orientation (e.g., 180 degrees from the first orientation), provide a charging signal having a second characteristic.

In some embodiments, the wireless headphone is manufactured by Apple.

In some embodiments, the circuitry is configured to detect the orientation of the wireless headphone within the headphone socket by detecting an input impedance (e.g., by measuring the input impedance).

In some embodiments, the circuitry is configured to adjust at least one of a voltage or a current of a signal provided by the power source to provide at least one of the charging signal having the first characteristic or the charging signal having the second characteristic.

In some embodiments, the circuitry is further configured to adjust at least one of the charging signal having the first characteristic or the charging signal having the second characteristic in accordance with a charging profile.

In some embodiments, at least a portion of the circuitry is further configured to conduct an authentication procedure with an external device (e.g., the wireless headphone, a phone, a tablet, or a computer. In some embodiments, the at least a portion of the circuitry comprises an authentication chip that is configured to conduct the authentication procedure with the external device.

Also disclosed herein are embodiments of a battery-free charging system for charging a pair of wireless headphones, each of the pair of wireless headphones having at least one proprietary electrical contact provided to charge an on-board power source of the wireless headphone. In some embodiments, the battery-free charging system comprises a connector for connecting the battery-free charging system to an external power source, at least one printed circuit board (PCB) coupled to the connector, the at least one PCB comprising circuitry, a cable coupled to the at least one PCB, the cable comprising four wires, a first end of each of the four wires coupled to the at least one PCB, a first headphone socket coupled to second ends of first and second wires of the cable, and a second headphone socket coupled to second ends of third and fourth wires of the cable. In some embodiments, the circuitry comprises a passive circuit and a controller coupled to the passive circuit. In some embodiments, the passive circuits is configured to detect: (a) a first orientation of a first wireless headphone of the pair of wireless headphones within the first headphone socket, wherein the first wireless headphone is either wireless headphone of the pair of wireless headphones, and (b) a second orientation of a second wireless headphone of the pair of wireless headphones within the second headphone socket, wherein the second wireless headphone is either wireless headphone of the pair of wireless headphones. In some embodiments, the controller is configured to (a) in response to the detected first orientation, cause a first charging signal having a first charging polarity to be provided to the first wireless headphone via the first and second wires, and (b) in response to the detected second orientation, cause a second charging signal having a second charging polarity to be provided to the second wireless headphone via the third and fourth wires.

In some embodiments, the first and second headphone sockets are configured to allow continued use of the first and second wireless headphones while charging.

In some embodiments, the controller is further configured to adjust at least one of a voltage or a current of a signal provided by the external power source to provide at least one of the first charging signal having the first charging polarity or the second charging signal having the second charging polarity.

In some embodiments, the controller is further configured to adjust a voltage or current of the first charging signal or the second charging signal during a charging cycle.

In some embodiments, the passive circuit is configured to detect an input impedance to detect the orientation of the first wireless headphone within the first headphone socket.

In some embodiments, the first and second charging polarities are different.

In some embodiments, the circuitry further comprises an authentication chip for authenticating the battery-free charging system.

In some embodiments, the circuitry is configured to set at least one of a current or a voltage of the first charging signal depending on a detected characteristic of the first wireless headphone (e.g., an identity of a manufacturer of the first wireless headphone or a proxy for the identity of the manufacturer of the first wireless headphone, a characteristic of the at least one proprietary electrical contact, etc.).

BRIEF DESCRIPTION OF THE DRAWINGS

Objects, features, and advantages of the disclosure will be readily apparent from the following description of certain embodiments taken in conjunction with the accompanying drawings in which:

FIGS. 5A, 5B, 5C, 5D, 5E, 5F, 5G, and 5H illustrate a headphone socket in accordance with some embodiments of a battery-free charging system.

Figure 1:
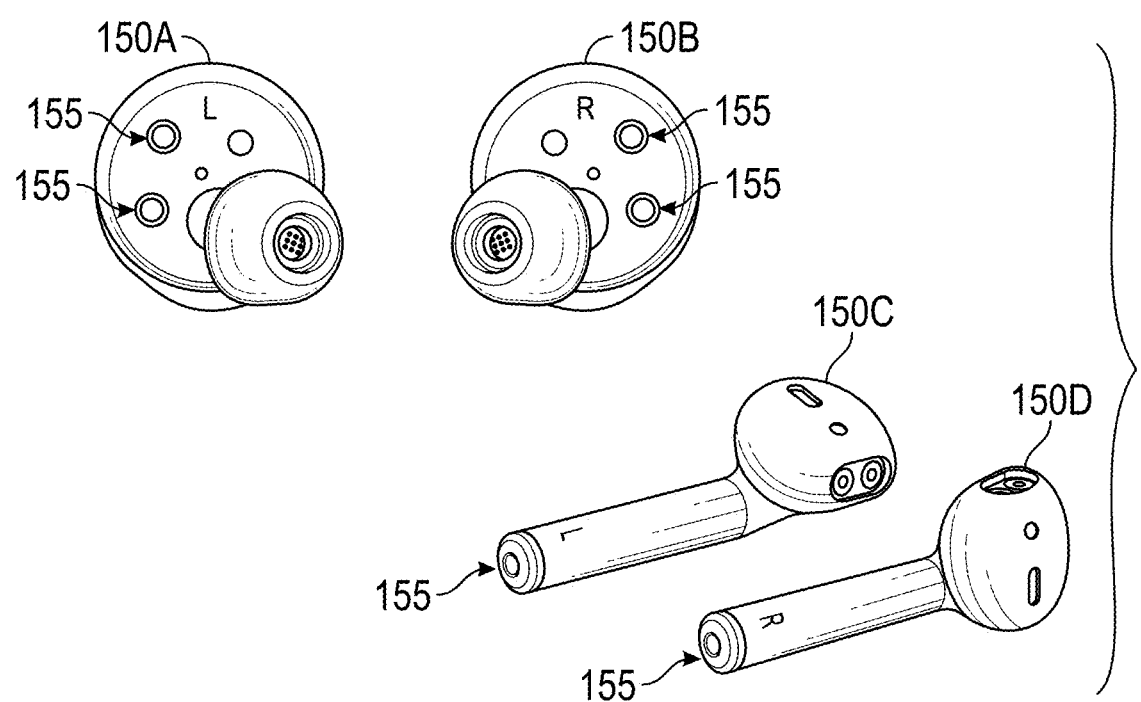
FIG. 1 illustrates two pairs of exemplary wireless headphones, each of which has proprietary electrical contacts for charging.

To facilitate understanding, identical reference numerals have been used, where possible, to designate identical elements that are common to the figures. When distinguishing between multiple instances of an element, individual elements are given a reference numeral followed by a letter. When referring to the element in general, irrespective of how many of that element may be referred to (e.g., one or more), only the reference numeral is used. Thus, for example, the drawings and detailed description show and/or refer to wireless headphone(s) 150 as well as wireless headphones 150A, 150B; headphone socket(s) 120 as well as headphone sockets 120A, 120B; wire(s) 112 as well as wires 112A, 112B, 112C, and 112D; electrical contact(s) 260 as well as electrical contacts 260A, 260B, etc.

It is contemplated that elements disclosed in one embodiment may be beneficially utilized in other embodiments without specific recitation. Moreover, in general, the description of an element in the context of one drawing is applicable to other drawings illustrating that element.

DETAILED DESCRIPTION

As explained above, the manufacturers of many in-ear wireless headphones use small proprietary electrical contacts to reduce the size of the wireless headphones and/or use limited available room for other components (e.g., batteries, circuitry, etc.). For instance, both the Samsung Galaxy Buds+ and the Apple AirPods use two-terminal, vendor-proprietary electrical contacts. FIG. 1 illustrates Samsung Galaxy Buds+ 150A,150B and Apple AirPods 150C, 150D, showing the locations of their proprietary electrical contacts 155 used for charging.

The battery in a wireless headphone may be entirely depleted before the wireless headphone is recharged. It is well known that a battery can be ruined if a charging signal having inappropriate characteristics (e.g., the wrong polarity, voltage, current, etc.) is applied to the battery. When the battery of a wireless headphone is depleted, it cannot power any on-board electronics that could otherwise provide information to allow an external charging source to determine which of the proprietary electrical contacts is connected to which terminal of the on-board battery, or to allow the identity (e.g., manufacturer) of the wireless headphone or its charging signal needs to be determined. Thus, existing charging solutions ensure the charging signal applies the correct polarity using mechanical means, such as a housing, or "smart case," into which one or more wireless headphones are inserted for charging. The smart case may use physical alignment and/or sophisticated communication to charge the wireless headphones across a simple power connection that is generally provided by a battery within the smart case (which itself may be rechargeable). For example, the case may have a shape that only allows each of the wireless headphone(s) to be seated in a specific position with a specific orientation that results in a proper charging signal being applied to the proprietary electrical contacts. For example, the Apple AirPods charging case prevents the AirPod power connectors on the bottoms of the stems from reaching the charging pads unless the AirPods are inserted in their designated sides of the case (left or right), and are oriented properly in their assigned cavities. Thus, the Apple AirPods case allows a single, mechanical orientation for charging, during which time the AirPods cannot be used by users.

Another approach to ensure that proper charging signals are provided to recharge wireless headphone batteries is to require users to intervene to align each wireless headphone within the charging case or other charging apparatus (e.g., by rotating it into a particular position) before charging the wireless headphone. For example, users of the Jodno AirPods Power Strap must "[p]ut your AirPods into JODNO charging strap, make sure L/R of your AirPods aligned with the Identification Window of strap."

The use of physical alignment, whether through a specially-designed charging case and/or user intervention, prevents a charging signal having the wrong characteristics (e.g., polarity, voltage, current, etc.) from being applied to charge wireless headphones, which would not properly charge the wireless headphones and could potentially damage them. The need to insert wireless headphones into a smart case is inconvenient for the user because the wireless headphones cannot be worn or used while they are charging, and the user needs to pay attention to how the headphones are placed in the case to ensure that the left headphone is situated in its intended cavity, and the right headphone is situated in its intended cavity. The need for user intervention, whether to place the headphones into a charging case or to use another solution requiring mechanical alignment, is inconvenient and prone to user error.

It would be a significant improvement to provide a system that can charge wireless headphones via vendor-proprietary electrical contacts while reducing or eliminating the need for user intervention and/or the potential for user errors that can damage the wireless headphones and/or frustrate users. It would also be a significant improvement to be able to charge wireless headphones that have vendor-proprietary electrical contacts using a solution that does not rely on a battery, but rather can be coupled to an external power source via, for example, a standardized connector (e.g., USB-C, micro-USB, etc.) so that the charging system could be plugged into, for example, a computer, mobile device, or mains power (e.g., via a wall wart). It would also be a significant improvement to provide a solution that allows wireless in-ear headphones to be used in their intended way (e.g., to transmit and/or receive wireless signals) while they are being charged.

Disclosed herein are battery-free wireless headphone charging systems and methods that allow wireless headphones having a variety of non-standardized (e.g., vendor-proprietary) electrical contacts to be charged using power supplied by an external power source while the wireless headphones are in use. The disclosed embodiments reduce or eliminate the potential for user errors by not requiring a particular orientation for charging, and, for two-headphone systems, by not requiring the left and right headphones to be distinguished from each other or treated differently from each other. Instead, the disclosed embodiments detect the orientations of the wireless headphones within headphone sockets and configure and provide one or more charging signals that have appropriate characteristics for the detected headphone orientation. The disclosed embodiments are thus agnostic as to the headphone "side" or "handedness."

Figure 2:
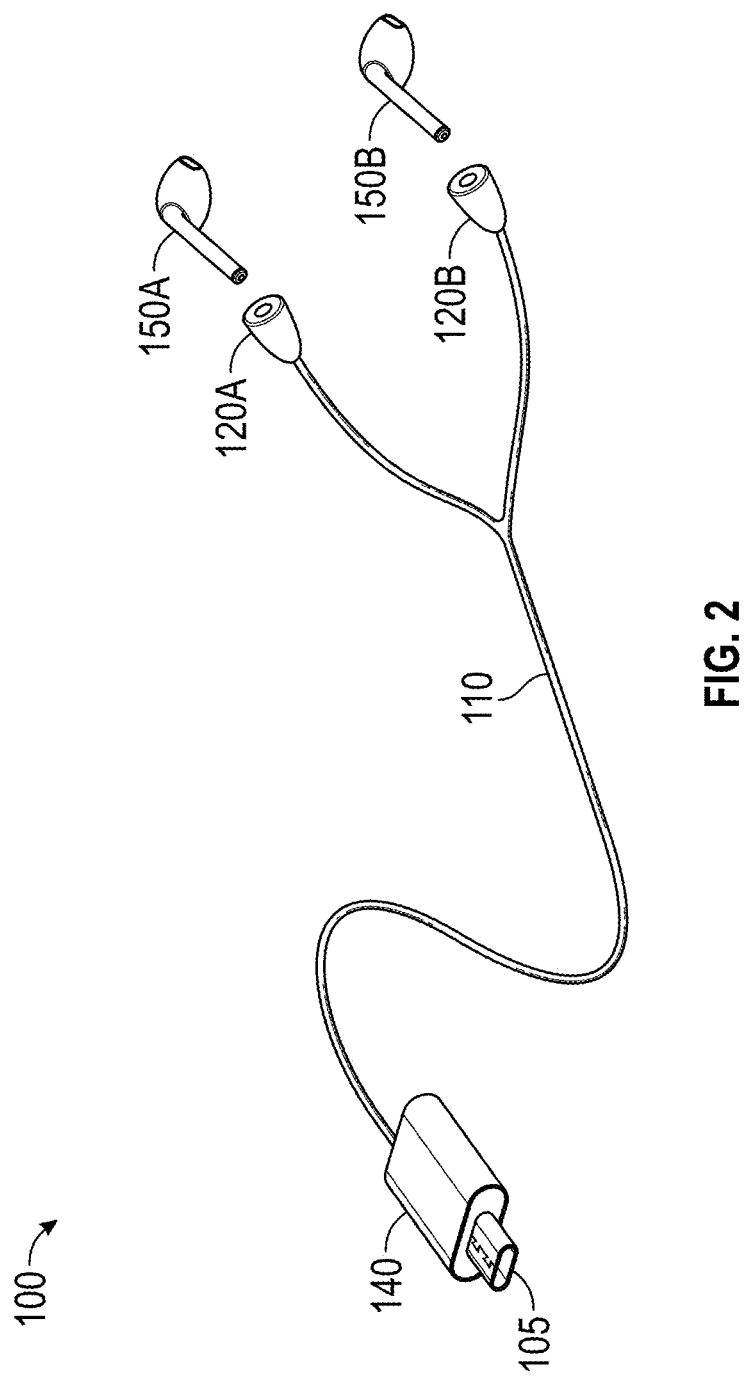
FIG. 2 illustrates an exemplary battery-free charging system in accordance with some embodiments.

FIG. 2 illustrates an exemplary battery-free charging system 100 for charging one or more wireless headphones 150 in accordance with some embodiments. As shown in FIG. 2, the battery-free charging system 100 includes a connector 105 for connecting the battery-free charging system 100 to an external power source. The external power source may be, for example, a mobile device (e.g., a phone, tablet, computer), a desktop computer, or mains power. In some embodiments, the connector 105 only provides power to charge one or more wireless headphones 150A, 150B. In some embodiments, the connector 105 also allows data to be transferred to/from the battery-free charging system 100 and/or the wireless headphone(s) 150A, 150B. The connector 105 may be, for example, a standardized connector (e.g., a type of USB) or a proprietary connector (which may have widespread use and/or may be a de-facto standard for certain vendors' products, etc.). Some examples of suitable connectors 105 include all variations of USB (e.g., type C, micro, mini, regular, etc.), Apple Lightning, and standard power plugs (e.g., two-prong plugs in the United States or equivalents elsewhere).

The battery-free charging system 100 also includes at least one printed circuit board (PCB) 140, shown in FIG. 2 disposed in a housing. The PCB 140 is described further below in the discussion of FIGS. 4A and 4B.

The battery-free charging system 100 also includes a cable 110. In the illustrated example, one end of the cable 110 is coupled to the PCB 140, and the other end is coupled to at least one socket 120. In the exemplary embodiment shown in FIG. 2, the other end of the cable 110 is coupled to the sockets 120A, 120B. Each of the sockets 120A, 120B is configured to receive a wireless headphone(s) 150A, 150B for charging. As described further below, each of the sockets 120A, 120B has a cavity into which a wireless headphone 150A, 150B can be placed for charging, and one or more electrical contacts for electrically interfacing to the headphone battery (e.g., via the proprietary electrical contacts 155). The sockets 120A, 120B may also include a PCB with some of the circuitry described herein. The interior of each of the sockets 120A, 120B may include a liner made of a material, such as silicone, that provides a somewhat sticky or tacky surface and/or a surface that causes friction and allows the wireless headphones 150A, 150B to be removably retained in the sockets 120A, 120B without a need for additional latches, clips, or snaps. It is to be appreciated that other approaches are contemplated, such as a latch, clip, rotary retention mechanism, or a snap to removably retain the wireless headphones 150A, 150B in the sockets 120A, 120B while they are charging. For example, the wireless headphones 150A, 150B can be retained in the sockets 120A, 120B using a spring-loaded retaining mechanism, a twist-and-lock mechanism, a bayonet feature, a threaded feature, an interference fit, and/or another type of retaining mechanism. The sockets 120A, 120B may be designed to fit a particular wireless headphone 150A, 150B (e.g., original Apple AirPods, etc.), or they may be able to accommodate and charge multiple types of wireless headphones 150A, 150B (e.g., two or more of AirPods, AirPods Pro, Samsung headphones, etc.).

The cable 110 is connected, directly or indirectly, to the one or more electrical contacts of each of the sockets 120A, 120B. When the connector is connected to an external power source, the cable 110 electrically connects the external power source to the one or more electrical contacts in the sockets 120A, 120B to provide at least a portion of the electrical power from the power source to each of the wireless headphones 150A, 150B when the wireless headphones 150A, 150B are inserted into the sockets 120A, 120B.

In some embodiments, as described further below, the cable 110 comprises a plurality of conductors and an insulating material (e.g., a set of cables or a plurality of wires in the same shell). The conductors of the cable 110 route power (and, in some embodiments, data signals) from an external power source (which may be a mobile device, computer, etc.) via the connector 105 and PCB 140 to the headphone sockets 120A, 120B. In some embodiments, the cable 110 comprises a user input device (such as, for example a volume control and/or mic button that may be found on some wired headphones). In some embodiments, the cable 110 does not include a user input device. The cable 110 may also, or alternatively, include a clip or other attachment apparatus to allow a user to removably secure the battery-free charging system 100 to another object, such as to a piece of clothing.

As illustrated in FIG. 2, the connector 105 is coupled to the PCB 140, which is coupled to the cable 110. As shown, the PCB 140 and/or at least a portion of the connector 105 and/or cable 110 may be disposed in a housing (e.g., to protect the PCB 140 and its circuitry, and its connections to the connector 105 and/or cable 110). Alternatively, or in addition, the PCB 140 may be overmolded.

When the wireless headphones 150A, 150B are retained in the sockets 120A, 120B, the electrical contacts 155 of the wireless headphone 150A, 150B interface with one or more electrical contacts of the sockets 120A, 120B (as described further below in the discussion of FIGS. 5A-5H) to provide an electrical interconnection that permits electrical charging power in the form of a charging signal to be delivered from the external power source, through the cable 110, and through the sockets 120A, 120B to the wireless headphones 150A, 150B. In some embodiments, data may also be communicated through the same electrical contacts and/or through different electrical contacts.

Figure 3A:
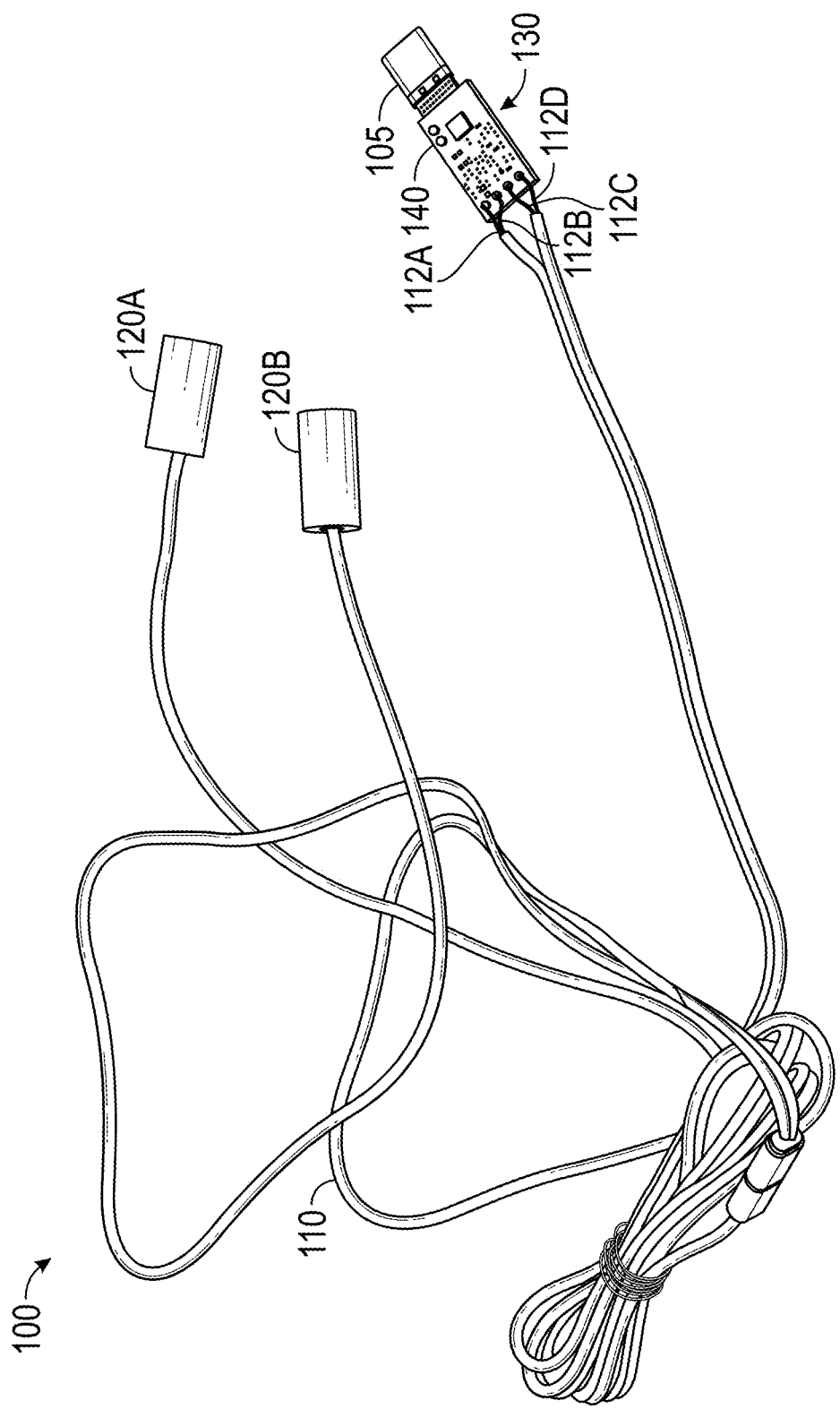
FIG. 3A illustrates an exemplary battery-free charging system in accordance with some embodiments.
Figure 3B:
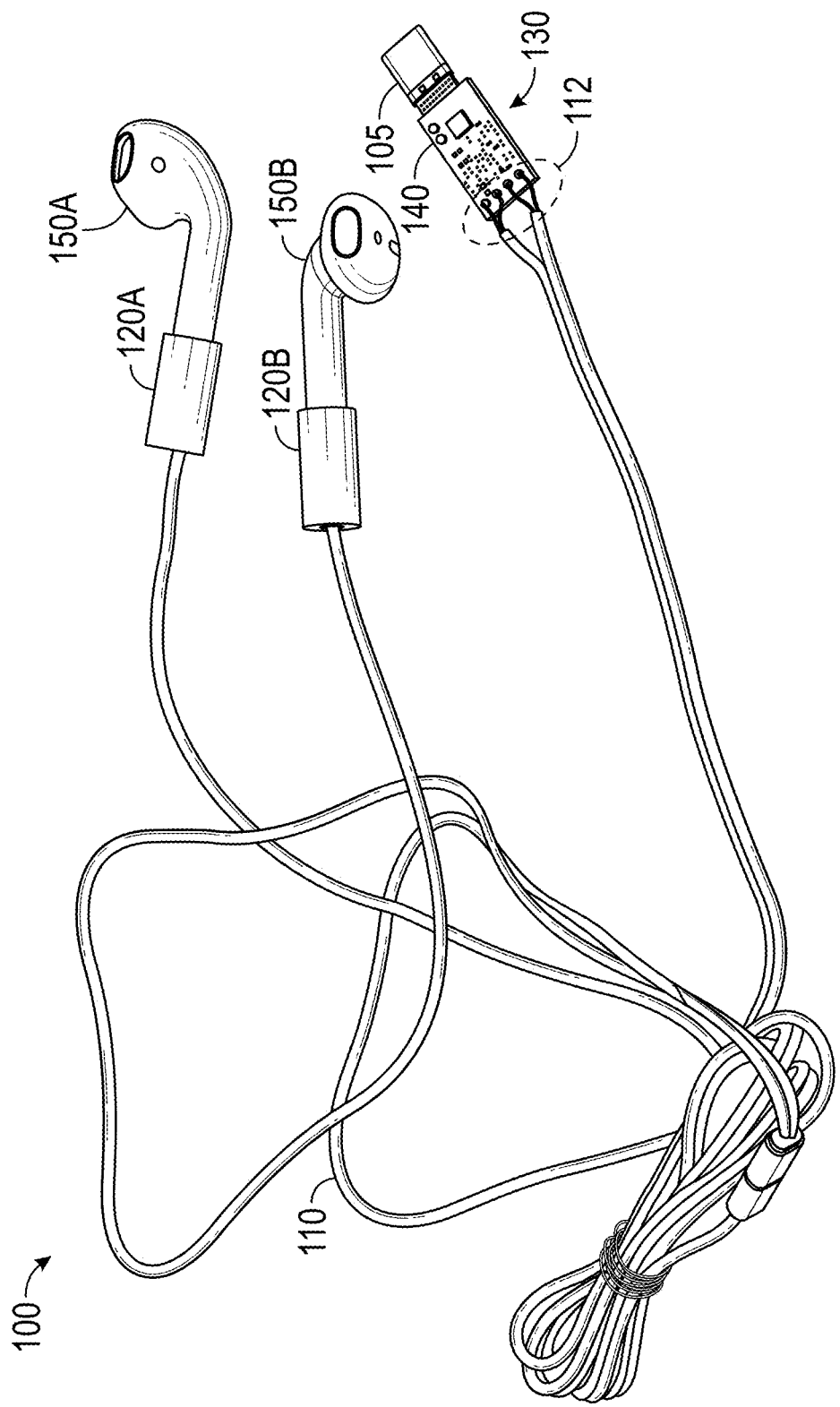
FIG. 3B illustrates the exemplary battery-free charging system of FIG. 3A with wireless headphones in place for charging in accordance with some embodiments.

FIG. 3A illustrates an exemplary battery-free charging system 100 in accordance with some embodiments. FIG. 3B illustrates the exemplary battery-free charging system 100 of FIG. 3A with exemplary wireless headphones 150A, 150B inserted, respectively, into the sockets 120A, 120B. FIG. 3B illustrates Apple AirPods as the wireless headphones 150A, 150B being charged, but it is to be appreciated that AirPods are just one examples of wireless headphones 150A, 150B that can take advantage of the disclosures herein.

In the exemplary embodiment shown in FIGS. 3A and 3B, the cable comprises four wires 112A, 112B, 112C, and 112D that split into two, 2-wire cable pairs. A first of the 2-wire cable pairs, which includes the wires 112A and 112B, is coupled to a first headphone socket 120A, and a second of the 2-wire cable pairs, which includes the wires 112C and 112D, is coupled to a second headphone socket 120B. When the wireless headphones 150A, 150B are inserted into the sockets 120A, 120B as shown in FIG. 3B, the wires 112 provide a charging signal and/or a data path to the wireless headphones 150A, 150B. The wires 112 are connected to the PCB 140.

Figure 4A:
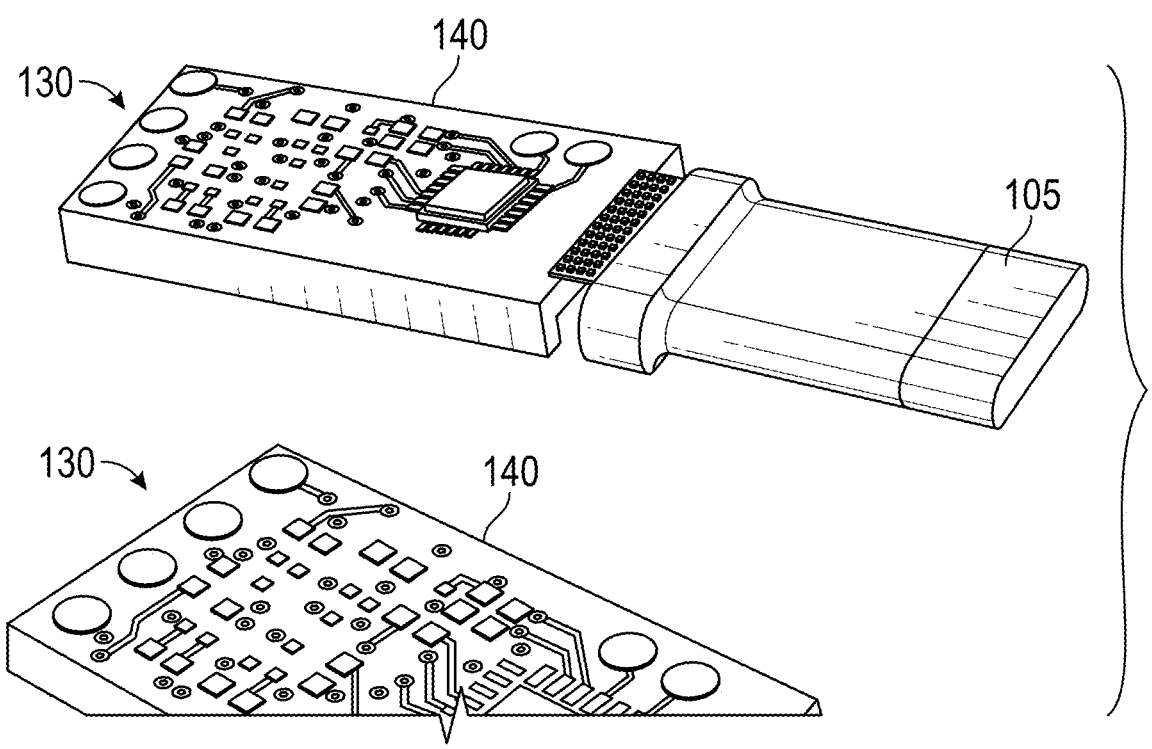
FIG. 4A illustrates an exemplary printed circuit board and connector suitable for use in one or more embodiments of a battery-free charging system.

FIGS. 3A and 3B also show the PCB 140, which includes circuitry 130. FIG. 4A is a closer view of an exemplary PCB 140 with exemplary circuitry 130 thereon. In some embodiments, the circuitry 130 includes electronic components such as, for example, a processor, an embedded microcontroller, an application-specific integrated circuit (ASIC), and/or similar component that is mounted to the PCB 140. In general, the circuitry 130 may include some or all of: communication components, discrete components, analog components, integrated circuits, a switch, a processor, a controller, non-transitory memory containing non-transitory software instructions for execution by a processor or controller, charging circuitry, a charge controller, and/or other components for operating, communicating with, and/or supplying electrical power to the wireless headphones 150A, 150B via the sockets 120A, 120B. In some embodiments, when connected to an external power source (e.g., via the connector 105), the circuitry 130 routes a charging signal via the cable 110 to one or both wireless headphones 150 of a wireless headset (e.g., one or two Apple AirpPods) seated in the headphone socket(s) 120A, 120B.

Figure 4B:
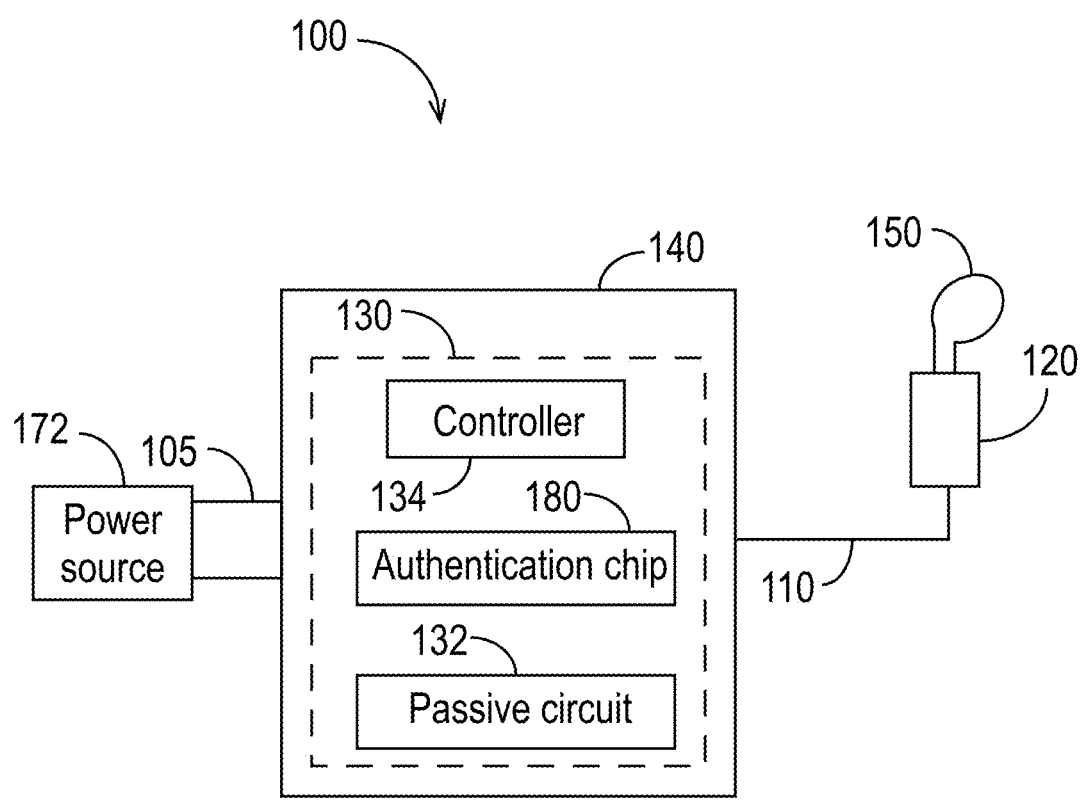
FIG. 4B is a diagram illustrating an exemplary battery-free charging system in accordance with some embodiments.

FIG. 4B is a diagram of an exemplary battery-free charging system 100 in which the circuitry 130 on the PCB comprises a controller 134, a passive circuit 132, and an authentication chip 180. (The circuitry 130 may also include other components, as described above. In addition, as explained above, there may be multiple PCBs (e.g., one near the connector and one in each of the sockets 120A, 120B), and the circuitry 130 may be distributed among multiple PCBs.) In some embodiments, the passive circuit 132 is configured to detect the orientation(s) of the wireless headphone(s) 150 in the socket(s) 120. In some embodiments, the controller 134 is coupled to the passive circuit 132 and is configured to execute machine-executable instructions to (a) determine the appropriate characteristics of charging signals based on the detected orientations of the wireless headphone(s) 150 in the socket(s) 120, and/or (b) cause appropriate charging signals to be provided to the wireless headphone(s) 150 via the cable 110 in response to the detected orientation(s). The controller 134 may be coupled to other electronic components involved in providing the charging signals, such as, for example, a voltage regulator, and/or other components that will be familiar to those having ordinary skill in the art. In some embodiments, the authentication chip 180 performs authentication tasks, as described further below in the discussion of FIGS. 8A-8C.

The circuitry 130 may contain communication components for exchanging data communications, or otherwise communicating with the wireless headphones 150A, 150B and/or with an external device, such as a mobile device, computer, etc. that is able to send data to and/or receive data from the wireless headphones 150A, 150B. Communication between the circuitry 130 and one or more external devices may occur through a wired connection and/or wirelessly.

Although some electronic devices can accommodate a charging signal of either of two possible polarities (e.g., positive or negative), they typically do so using a rectification circuit. Typically, wireless headphones do not have such rectification circuits and therefore present a significant challenge, particularly because their batteries may be completely depleted when they are inserted into the headphone sockets 120A, 120B, in which case they are unable to participate in a bi-directional data link to communicate orientation or charging signal polarity requirements, as some other types of devices (e.g., USB-C devices) are able to do.

One significant feature of the exemplary embodiments disclosed herein is that they do not require the headphones 150A, 150B to be inserted into the sockets 120A, 120B in a single, pre-defined orientation in order for an appropriate charging signal to be provided for charging. Instead, the embodiments disclosed herein are able to detect the orientations of the headphones 150A, 150B within the sockets 120A, 120B and provide charging signals having appropriate characteristics (e.g., voltage, current, polarity), even when the on-board batteries of the wireless headphones 150A, 150B are completely depleted.

In some embodiments, the circuitry 130 of the PCB 140 includes a passive circuit 132 that detects the orientations of wireless headphones 150 inserted into the sockets 120A, 120B. In some embodiments, the circuitry 130 on the PCB 140 detects the presence and/or absence of a headphone 150 in a headphone socket 120A, 120B and modifies or configures a charging signal based on whether one or two headphones 150A, 150B are connected. In some embodiments, the circuitry 130 on the PCB 140 detects the orientation of a headphone 150 within a headphone socket 120A, 120B and modifies or configures a charging signal based on the detected orientation. For example, in some embodiments, each of the wireless headphones 150A, 150B can be inserted into the sockets 120A, 120B in either of two orientations, such as a first orientation and a second orientation that is 180 degrees from the first orientation, and the circuitry 130 detects in which of the two orientations each of the wireless headphones 150A, 150B is situated and provides a charging signal having the appropriate polarity, voltage, etc. In some embodiments, each of the wireless headphones 150A, 150B can be inserted into the sockets 120A, 120B in any orientation, and the sockets 120A, 120B and/or the circuitry 130 detect the location(s) within the sockets 120A, 120B of the electrical contacts 155 and provide an appropriate charging signal.

In some embodiments, either the left or right headphone 150 may be inserted into either socket 120A or socket 120B. In other words, in some embodiments, the sockets 120A, 120B are agnostic as to the "handedness" or "side" of the wireless headphone 150 that is inserted into it for charging.

Although FIGS. 3A and 3B illustrate only circuitry 130 on the PCB 140, it is to be understood that the sockets 120A, 120B can also include circuitry. In general, either or both of the PCB 140 and the sockets 120A, 120B can include some or all of the circuitry 130.

As shown in FIGS. 3A and 3B, one end of the cable 110 is coupled to the PCB 140, and the other end of the cable 110 is coupled to the at least one headphone socket 120A, 120B to which the wireless headphone(s) 150A, 150B are (FIG. 3B), or can be (FIG. 3A), coupled for charging. In some embodiments, coupling the wireless headphone(s) 150A, 150B to the at least one headphone socket 120A, 120B comprises inserting at least a portion of the wireless headphone(s) 150A, 150B into the at least one headphone socket 120A, 120B. When the wireless headphone(s) 150A, 150B are coupled to the at least one headphone socket 120A, 120B, they may be used while being charged. In some embodiments, only a portion of each wireless headphone 150A, 150B is inserted into each of the at least one headphone socket, and the portion of each wireless headphone 150A, 150B that remains exposed can be worn in its intended way by the user.

FIGS. 2, 3A, 3B, and 4A illustrate a USB Type-C connector as the connector 105, but it is to be appreciated that other connector types and power sources can alternatively be used. For example, the source of power to the battery-free charging system 100 does not necessarily need to be provided via a physical connector 105. For example, the power source could be a wireless puck designed to work with a wireless power supply like the Qi standard or the Apple watch or iPhone charging pad. In this case, the connector 105 could be replaced by a suitable component configured to operate with such a power source.

Most simplified charging schemes (in the case of the Apple AirPods, its two proprietary electrical contacts 155) use some type of power regulation and communication to properly interface and provide power to charge the wireless headphones 150A, 150B. In some embodiments of the battery-free charging system 100, the components that provide this regulation and control (e.g., a microcontroller, power regulator, etc.) are the circuitry 130 built into the PCB 140 coupled to the connector 105. Alternatively, some or all of these components (some portion of the circuitry 130) may be disposed in the headphone sockets 120. In some embodiments, some or all of the electronic components (e.g., circuitry 130) are located on a device into which the connector 105 is inserted, or in the wireless headphones 150 themselves. In the exemplary embodiment illustrated in FIGS. 3A, 3B, and 4A, the electronic components are shown as the circuitry 130 on the PCB 140 that is coupled to a USB Type-C connector.

In some embodiments, the connector 105 or PCB 140 includes a visual indicator (e.g., a light-emitting diode (LED)) that indicates status of the wireless headphone battery (or batteries) (e.g., whether wireless headphones 150A, 150B coupled to the battery-free charging system 100 are being charged). For example, a LED can be controlled by the PCB 140 circuitry 130 to emit light of a certain color and/or pulse in different ways to indicate whether the wireless headphones 150A, 150B are charging, are fully charged, etc.

The headphone sockets 120A, 120B are the devices that provide a physical connection to the wireless headphones 150A, 150B and facilitate an electrical connection to their battery terminals to allow for them to recharge. A number of considerations may be taken into account in the design of the headphone sockets 120A, 120B. Some of these considerations include, for example, cable 110 location for user comfort while the wireless headphones 150A, 150B are in use during charging, potential ports for microphone use, method of electrical connection, and method of physical connection.

Figure 5A:
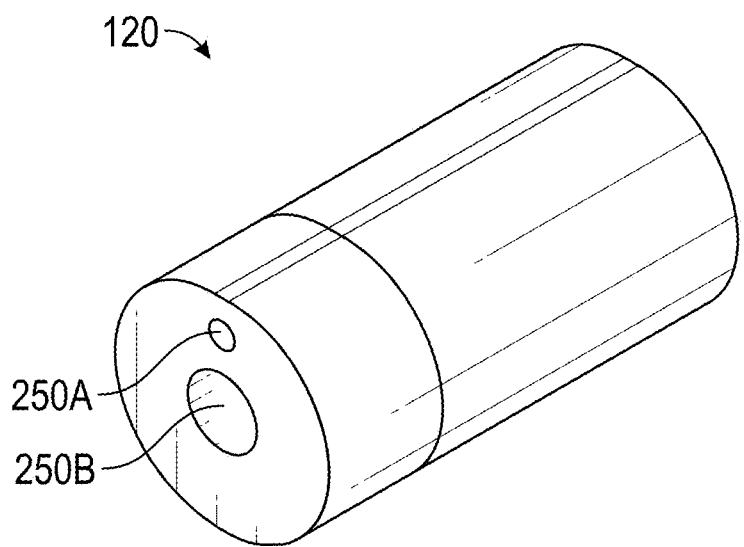

FIGS. 5A-5H illustrate an exemplary headphone socket 120 in accordance with some embodiments. FIG. 5A is an isometric view from the bottom of the exemplary headphone socket 120. As shown in FIG. 5A, the exemplary headphone socket 120 has two holes, 250A, 250B. The hole 250A may be provided to allow the cable 110 to be attached to electronics (e.g., circuitry, the electrical contacts, etc.) within the socket 120 to allow the headphone 150A, 150B to be charged. The hole 250B may be provided to allow a microphone of the wireless headphone 150A, 150B to remain open to receive sound when the wireless headphones 150A, 150B are in use while being charged.

Figure 5B:
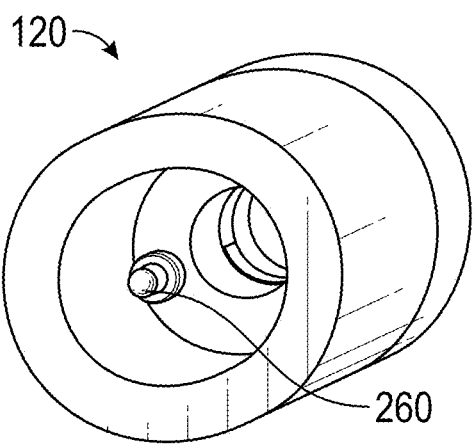
Figure 5C:
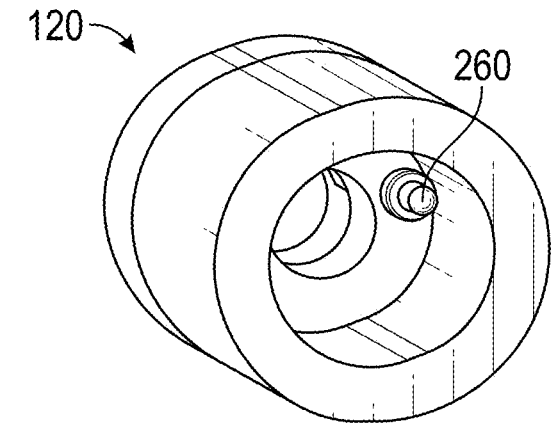

FIGS. 5B and 5C show two isometric views of the top of the exemplary headphone socket 120, including the interior in which the headphone 150A, 150B is seated for charging. FIGS. 5B and 5C show an electrical contact 260 (e.g., a spring contact) that provides the electrical connection between the wireless headphone 150A, 150B to the cable 110 in the interior of the socket 120.

Figure 5G:
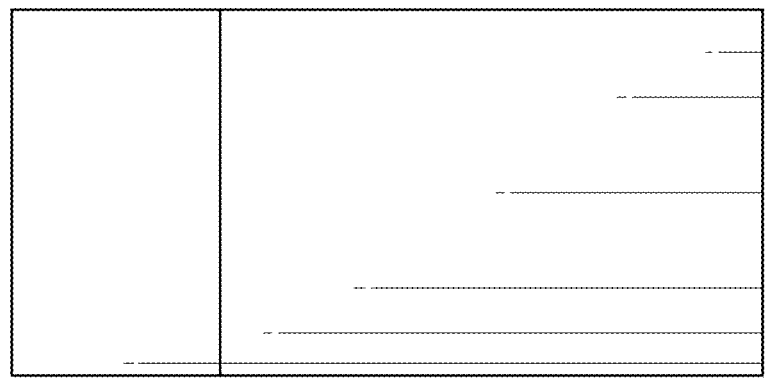
Figure 5H:
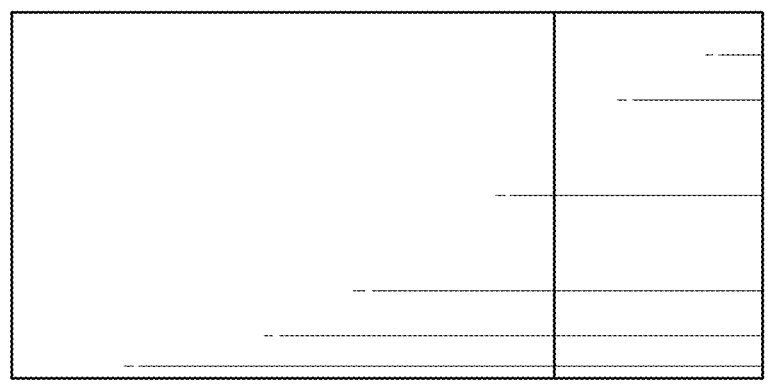

FIG. 5D is a view of the bottom of the exemplary headphone socket 120. FIG. 5E is a view of the top of the exemplary headphone socket 120, which illustrates the interior of the headphone socket 120 and two electrical contacts 260A, 260B. FIGS. 5F, 5G, and 5H are side views of the exemplary headphone socket 120.

In the exemplary embodiment illustrated in FIGS. 5A-5H, the headphone socket 120 has an open bottom (the hole 250B; see, e.g., FIGS. 5A-5E) to allow for the wireless headphone 150A, 150B (shown as an Apple AirPod) microphone to work normally while the wireless headphone 150A, 150B is being charged, which can be important because the headphone socket 120 allows the wireless headphone 150A, 150B to continue to be used (e.g., during a long call) while charging. The exemplary headphone socket 120 uses friction as the mechanism to retain the headphone 150A, 150B. Other approaches can be used instead as previously described, as will be appreciated by those having ordinary skill in the art in view of the disclosures herein. The exemplary headphone socket 120 uses electrical contacts 260A, 260B (see, e.g., FIGS. 5B, 5C, 5E) for the electrical connection mechanism. It is to be understood that other mechanisms and types of contacts can be used to electrically connect and charge the headphones 150A, 150B, and the examples given herein are not meant to be limiting.

The socket 120 may, but is not required to, include circuitry disposed between and coupled to the electrical contacts 260A, 260B and the cable 110. For example, this circuitry could include the passive circuit 132 and/or other of the circuitry 130 described above and elsewhere herein.

In some embodiments, the orientation of a headphone 150 within the headphone socket 120 can vary (e.g., a headphone 150 is not required to have any particular orientation within the socket 120 in order to be charged; it may be in a different rotational position within the socket 120 from one charging session to the next). For example, when the battery-free charging system 100 includes sockets 120 for Apple AirPods or other wireless headphones 150 that have a cylindrical stem, the headphone 150 can be in any rotational position within the socket 120 for charging. The circuitry 130 of the at least one PCB 140 (wherever located and/or however distributed within the battery-free charging system 100) determines the orientation of the headphone 150 and ensure that an appropriate charging signal is provided. For example, the circuitry 130 can measure the input impedance to determine the orientation of headphone 150. For example, a headphone 150 may be inserted in a first orientation during a first charging session, and then in a second orientation, rotated by some angle (e.g., 180 degrees) from the first orientation, during a second charging session. The circuitry 130 of the at least one PCB 140 (which, as explained, may include circuitry in the socket 120) can detect the difference in orientation and adjust the charging signal accordingly to prevent damage to the headphone 150. In some embodiments, the battery-free charging system 100 includes (e.g., on the at least one PCB 140) a current limiter to prevent overcharging and to prevent power from being delivered to the wireless headphone(s) 150 in the case of an electrical short or other failure that might otherwise cause a power surge or damage to the headphone(s) 150.

In some embodiments, the circuitry 130 manages and provides the charging signal(s) according to a charging profile. For example, the headphone(s) 150 may include a lithium-ion (Li-Ion) battery, and the circuitry 130 provides a current-limited fixed voltage. The circuitry 130 can provide current to the wireless headphone 150 battery to bring the battery voltage up to a pre-set value referred to as the set-point voltage or the set voltage. As an example, some Li-Ion batteries have a set-point voltage of approximately 4.2 V. Apple AirPods have a set-point voltage closer to 5 V. In some embodiments, after the set-point voltage is reached, the circuitry 130 sources only enough current to hold the voltage of the wireless headphone 150 battery at the set-point voltage.

In some embodiments, the charging cycle is divided into two phases, namely the constant current phase and the constant voltage phase. In the constant current phase, during which about two-thirds of the total charge is delivered to the battery, the circuitry 130 provides a charging signal at the maximum charging current, because the battery voltage is below the set-point voltage. When the circuitry 130 senses that the voltage of the battery is at the set-point voltage, the circuitry 130 reduces the charging current to hold the battery voltage at the set-point voltage during the constant voltage phase.

Thus, the charging signal(s) provided by the wireless headphone charging system 100 can vary with time according to a charging profile, which may be dependent on the characteristics of the wireless headphone 150 battery (or batteries). By accurately providing a charging signal (or signals) in accordance with a charging profile, the circuitry 130 can avoid undercharging the wireless headphone 150 battery while also avoiding reducing the number of charge cycles the battery can complete by overcharging.

Figure 6:
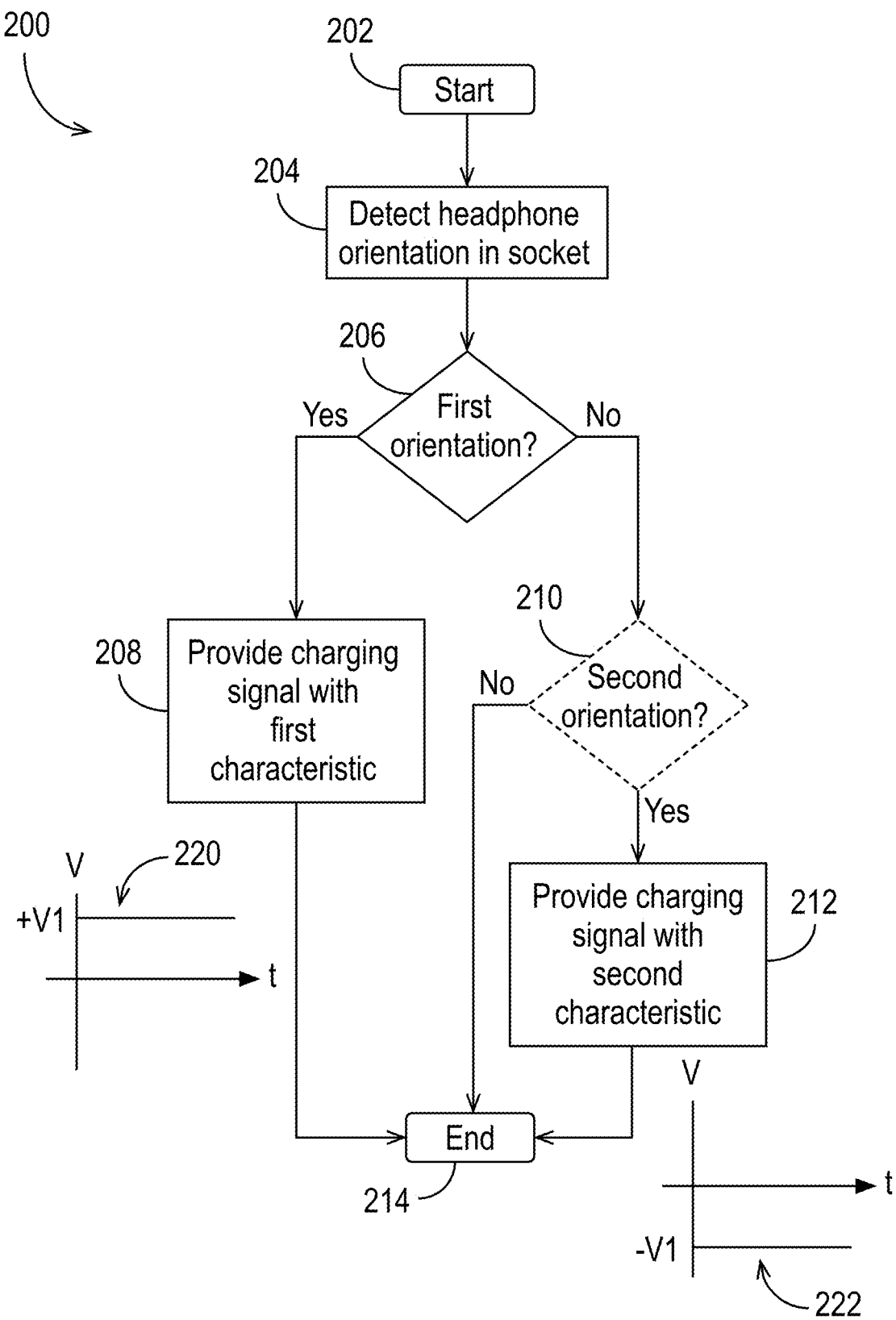
FIG. 6 illustrates an exemplary procedure that can be performed by a battery-free charging system in accordance with some embodiments.

FIG. 6 illustrates an exemplary procedure 200 performed by a wireless headphone charging system 100 in accordance with some embodiments. The procedure 200 allows the circuitry 130 to determine in which of two possible orientations within the socket 120 a headphone 150 is situated, in accordance with some embodiments. The procedure 200 may be performed by the circuitry 130 of the at least one PCB 140, possibly in combination with circuitry of the headphone socket 120.

At 202, the procedure 200 begins. At 204, the orientation of the headphone 150 in the socket 120 is detected (e.g., by measuring the input impedance, by communicating with an active component of the wireless headphone 150, etc.). At 206, it is determined whether the orientation is a first orientation. If so, then at 208 the circuitry 130 provides, via the cable 110, a charging signal 220 that has a first characteristic, and the procedure 200 ends at 214. The first characteristic may be, for example, a polarity, a voltage, or any other characteristic of a charging signal. FIG. 6 illustrates a charging signal 220 that has a positive polarity, +V1, but this is merely an example. If, at 206, it is determined that the orientation of the headphone 150 within the socket 120 is not the first orientation, then, optionally, at 210, it can be determined if the orientation is a second orientation. If so, then at 212, the circuitry 130 provides, via the cable 110, a charging signal 222 that has a second characteristic, and the procedure 200 ends at 214. The second characteristic may be, for example, a polarity, a voltage, or any other characteristic of a charging signal. FIG. 6 illustrates an exemplary second charging signal 222 that has a negative polarity, −V1, this is merely an example.

It is to be appreciated that the determination at 210 is optional because if only two orientations are possible, and it is determined that the orientation is not the first orientation, then it can be assumed that the orientation is the second orientation, and the charging signal having the second characteristic can be provided. It is also to be appreciated that rather than determining, at 206, whether the orientation is the first orientation, the battery-free charging system 100 could instead determine in which of the two possible orientations within the socket 120 the headphone 150 is situated in a single step (e.g., determine whether the orientation is 0 degrees or 180 degrees). Such variations are contemplated and within the scope of the disclosures herein.

It is to be appreciated that when the battery-free charging system 100 includes multiple sockets 120, the procedure 200 can be performed separately for each socket 120, either substantially simultaneously or in sequence. It is also to be appreciated that when the battery-free charging system 100 includes multiple sockets 120, the procedure 200 may result in different charging signals being provided to different headphones 150, both during a particular charging session and from one charging session to the next.

Figure 7:
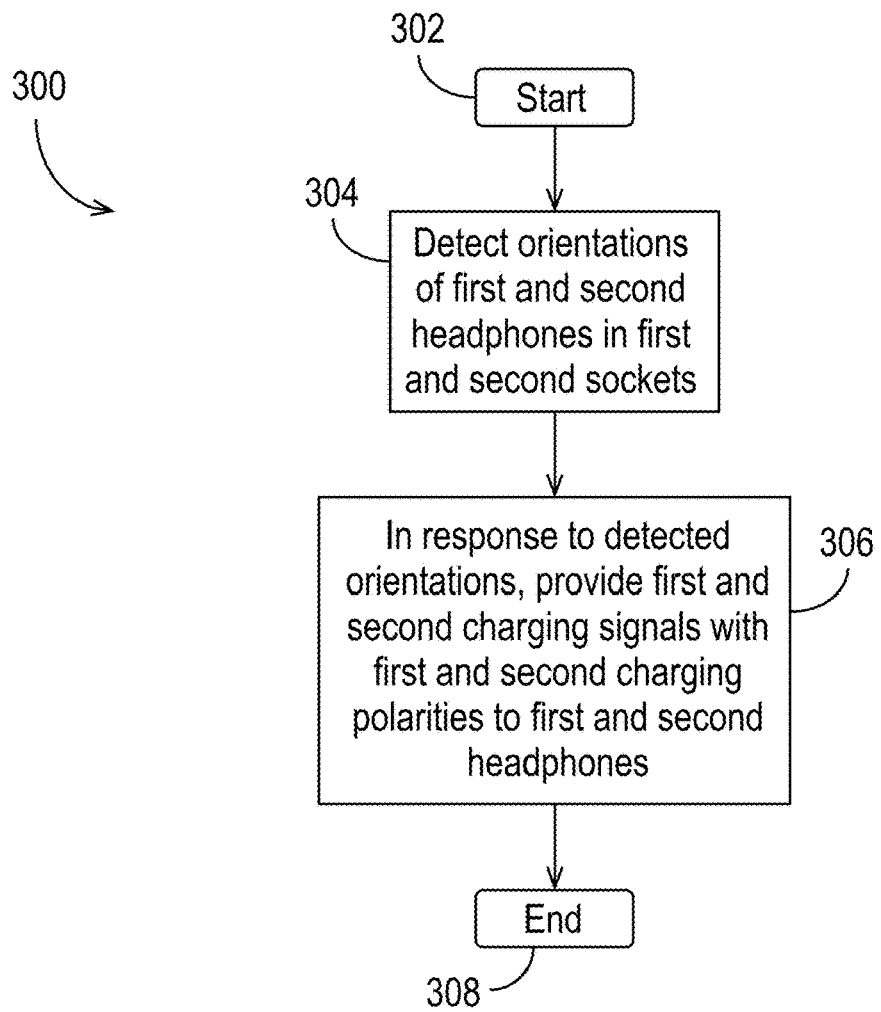
FIG. 7 illustrates another exemplary procedure that can be performed by a battery-free charging system in accordance with some embodiments.
Figure 7:
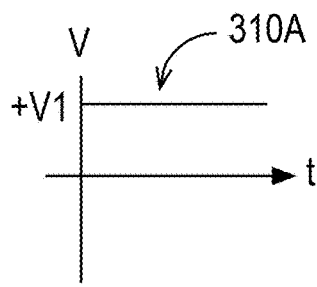
Figure 7:
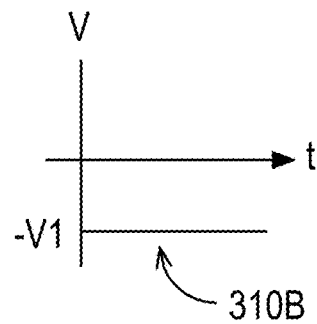
Figure 7:
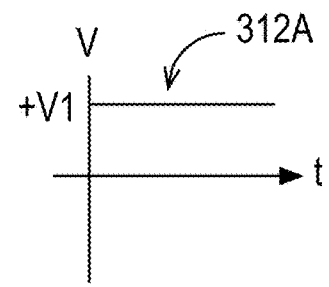
Figure 7:
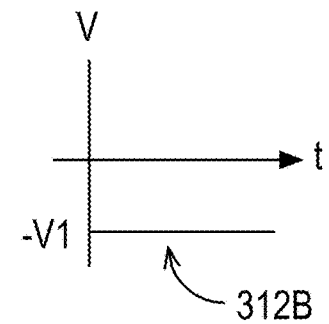

FIG. 7 illustrates another exemplary procedure 300 performed by a wireless headphone charging system 100 in accordance with some embodiments. Using the procedure 300, the battery-free charging system 100 determines the orientations of first and second headphones 150A, 150B within the sockets 120A, 120B and provides appropriate charging signals in response to the detected orientations in accordance with some embodiments. The procedure 300 may be performed by the circuitry 130 of the at least one PCB 140, possibly in combination with circuitry of the headphone sockets 120A, 120B.

At 302, the procedure 300 begins. At 304, the orientations of the first and second headphones 150A, 150B within the first and second sockets 120A, 120B are detected. As just one example, the circuitry 130 can detect the input impedances of the first and second headphones 150A, 150B (e.g., by measuring them). As another example, the circuitry 130 can use an optical detector (e.g., a photodiode, a QR code detector, etc.) in each of the sockets 120A, 120B to detect the presence and orientations of the wireless headphones 150A, 150B. The orientations may be limited to a set of discrete orientations (e.g., first and second orientations, 8 possible orientations, etc.), or they may be effectively unlimited (e.g., the headphones 150A, 150B can take any position within the sockets 120A, 120B). At 306, in response to the detected first and second orientations, the battery-free charging system 100 provides first and second charging signals with first and second polarities to the first and second headphones 150A, 150B via the cable 110. At 308, the procedure 300 ends.

FIG. 7 illustrates two exemplary first charging signals 310A, 310B and two exemplary second charging signals 312A, 312B. The first charging signal 310A has a positive polarity, +V1, and the first charging signal 310B has a negative polarity, −V1. Similarly, the second charging signal 312A has a positive polarity, +V1, and the second charging signal 312B has a negative polarity, −V1. It is to be appreciated that although FIG. 7 illustrates only two exemplary first charging signals 310A, 310B and only two exemplary second charging signals 312A, 312B, the battery-free charging system 100 may be able to provide a much larger variety of charging signals (e.g., charging signals with a wide variety of characteristics such as polarity, voltage, current, frequency, etc.).

It is to be appreciated that in addition to detecting the orientation of the wireless headphones 150A, 150B, in some embodiments, the battery-free charging system 100 (e.g., using the circuitry 130) is also able to detect the identity of the wireless headphones 150A, 150B (e.g., Apple AirPod, Samsung Galaxy Buds+, Bose SoundSport, etc.) in the sockets 120A, 120B, or a proxy for the identity, such as, for example, an impedance, a code, etc., and provide charging signals having the appropriate characteristics (e.g., voltage, polarity, etc.). Alternatively, or in addition, the battery-free charging system 100 can detect characteristics of the vendor-proprietary electrical contacts.

In some embodiments, the circuitry 130 includes an authentication chip 180 that allows the battery-free charging system 100 to be authenticated by the wireless headphones 150A, 150B and/or an external device and/or a remote authentication server. Authentication may be required by the wireless headphone vendor in order for the battery-free charging system 100 to be allowed to charge the headphones 150A, 150B. In addition or alternatively, authentication may be desirable to allow the battery-free charging system 100 to perform or be involved in operations beyond simply charging the wireless headphones 150A, 150B.

Figure 8A:
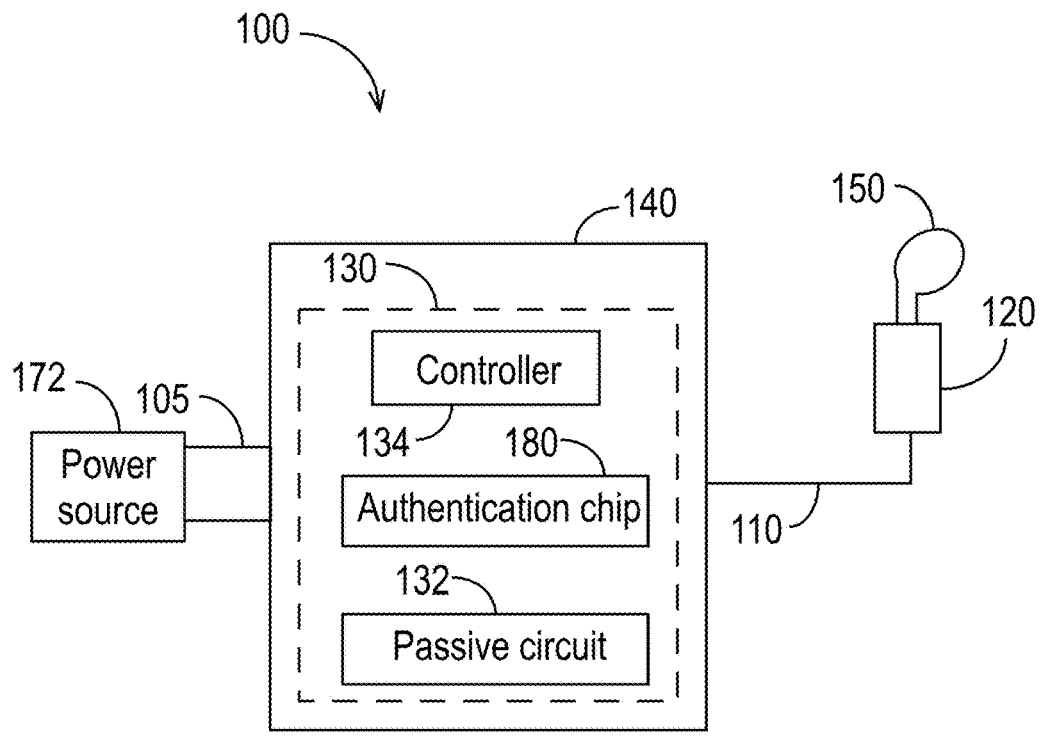
FIGS. 8A, 8B, and 8C illustrate exemplary battery-free charging systems with authentication capabilities in accordance with some embodiments.

FIG. 8A illustrates an exemplary battery-free charging system 100 that provides for authentication in accordance with some embodiments. In the illustrated example, the circuitry 130 of the PCB 140 includes, in addition to the passive circuit 132 and controller 134, an authentication chip 180. Once the battery-free charging system 100 has been connected to the power source 172, the authentication chip 180 communicates with the wireless headphone(s) 150 via a data connection established over the cable 110 to conduct an authentication procedure. The authentication procedure may include, for example, a handshaking procedure. Those skilled in the art will be familiar with authentication procedures, which may be specified by the manufacturer of the wireless headphones 150A, 150B. Thus, the battery-free charging system 100 can be authenticated directly by the wireless headphones 150A, 150B.

Figure 8B:
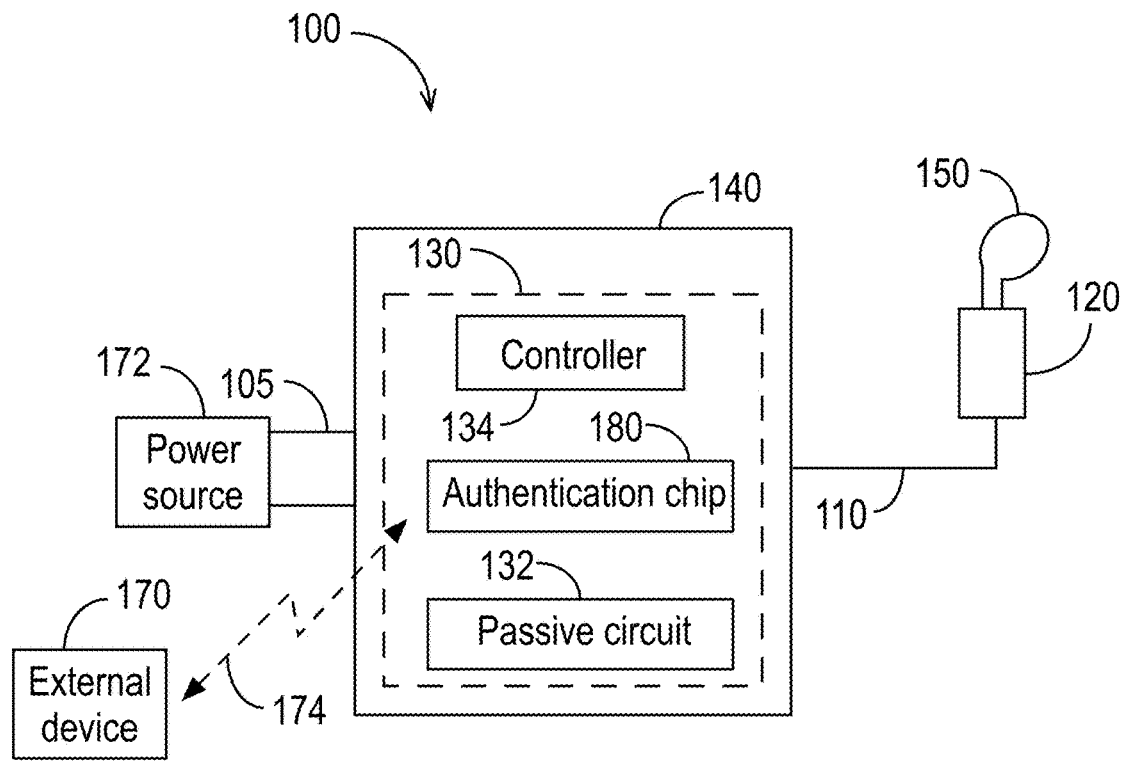

FIG. 8B illustrates another exemplary battery-free charging system 100 that provides for authentication in accordance with some embodiments. In the illustrated example, the circuitry 130 of the PCB 140 includes a controller 134 and an authentication chip 180. In this example, once the battery-free charging system 100 has been connected to the power source 172, the circuitry 130 establishes a data connection 174 with an external device 170 (e.g., a mobile device (e.g., phone, tablet, laptop), computer, etc.). The power source 172 and external device 170 may be distinct from each other, in which case the data connection 174 can be a wireless connection to the external device. The power source 172 and external device 170 may be the same device, in which case the data connection 174 can be a wired connection provided via the connector 105 or a wireless connection. In this example, the authentication chip 180 of the battery-free charging system 100 can authenticate with the external device 170 (via, e.g., a wireless connection or a wired connection made via the connector 105). The authentication procedure may include, for example, a handshaking procedure.

Figure 8C:
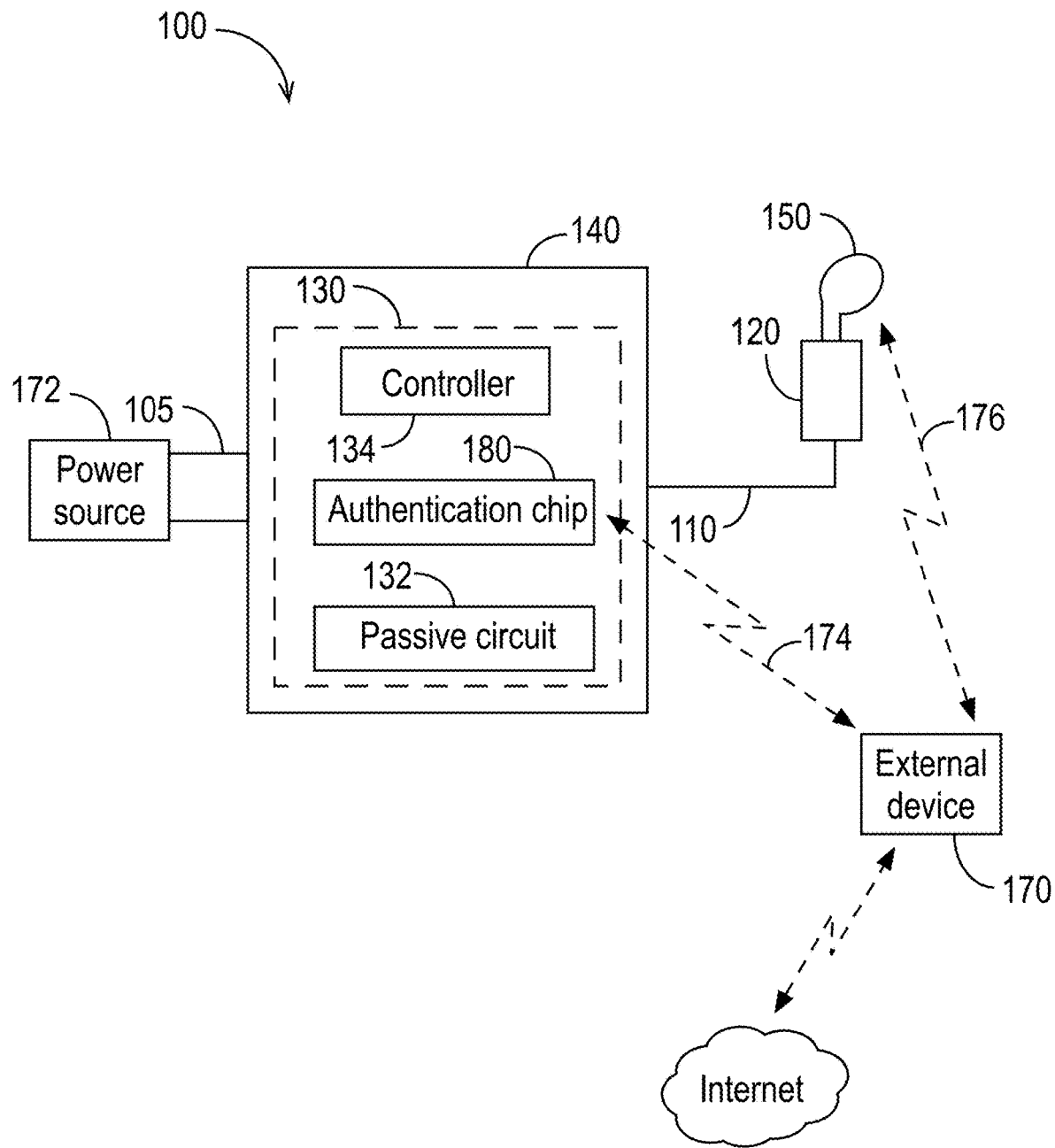

FIG. 8C illustrates another exemplary battery-free charging system 100 that provides for authentication in accordance with some embodiments. In the illustrated example, the circuitry 130 of the PCB 140 includes a controller 134 and an authentication chip 180. In this example, once the battery-free charging system 100 has been connected to the power source 172, the circuitry 130 establishes a data connection 174 with an external device 170 (e.g., a mobile device (e.g., phone, tablet, laptop), computer, etc.). The power source 172 and external device 170 may be distinct from each other, in which case the data connection 174 can be a wireless connection to the external device. The power source 172 and external device 170 may be the same device, in which case the data connection 174 can be a wired connection provided via the connector 105 or a wireless connection. In this example, the battery-free charging system 100 communicates with the external device 170 (via, e.g., a wireless connection or a wired connection made via the connector 105). The external device 170 may optionally perform authentication tasks via the Internet. In some embodiments, the external device 170 establishes a wireless data connection 176 with the wireless headphone(s) 150 and updates the firmware on the wireless headphone(s) 150. Once the firmware has been updated, the wireless headphone(s) 150 can authenticate the battery-free charging system 100 so that it is approved for future use with the wireless headphone(s) 150. The authentication procedure may include, for example, a handshaking procedure.

Although FIGS. 8B and 8C illustrate the power source 172 and the external device 170 as separate blocks, as explained above, the external device 170 may include or may be the power source 172 (e.g., the external device 170 may be a mobile phone, laptop computer, tablet, etc. that can both communicate with and provide power to the battery-free charging system 100).

As will be appreciated in view of the disclosures herein, a battery-free charging system 100 may be designed for a specific wireless headphone 150 based on the physical geometry and electrical characteristics of the headphone 150 to be charged. For example, some of the embodiments described and shown herein may be used to charge the original Apple AirPods. By modifying the headphone socket(s) 120, the battery-free charging system 100 can be made to charge other types of wireless headphones 150 (e.g., later-generation Apple AirPods, wireless headphones from other manufacturers, etc.).

It is also to be appreciated that the battery-free charging system 100 may be modular, such that a first (set of) headphone socket(s) 120 for charging a first wireless headphone 150 type may be detached and replaced by a second (set of) headphone socket(s) 120 for charging a second wireless headphone 150 type.

Although the discussion herein focuses on in-ear wireless headphones as examples of wireless headphones that can benefit from the disclosed systems and methods, it is to be appreciated that the disclosures can also be used for other types of wireless headphones (e.g., over-the-ear headphones or other headsets). Moreover, although the focus herein is on wireless headphones that have proprietary electrical contacts, the disclosed concepts can also be applied to wireless headphones that use standardized electrical contacts (e.g., mini-USB, micro-USB, USB-C, etc.).

It is also to be understood that the embodiments described herein are exemplary of a class of devices that can work for a much larger number and variety of wireless headsets. It will be appreciated by those having ordinary skill in the art that several features of the exemplary embodiment would be applicable to any of these systems.

It is also to be appreciated that although many of the examples shown and described herein assume the use of two headphones 150A, 150B (and, therefore, two sockets 120A, 120B, etc.), a battery-free charging system 100 may include, for example, only one socket 120.

It is also to be appreciated that although the discussion herein assumes the use of DC charging signals, a charging signal could be an AC signal. Such variations are contemplated and are within the scope of the disclosures herein.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A battery-free charging system for a wireless headphone, the wireless headphone having at least one proprietary electrical contact provided to charge an on-board power source of the wireless headphone, the battery-free charging system comprising:
   a cable having a first end and a second end;
   a headphone socket coupled to the first end of the cable;
   a connector coupled to the second end of the cable, the connector for connecting the battery-free charging system to an external power source; and
   circuitry coupled to the headphone socket and to the connector, wherein:
   the headphone socket is configured to receive the wireless headphone, to couple the at least one proprietary electrical contact to the external power source, and to allow continued use of the wireless headphone while charging, and the circuitry is configured to:
- detect an orientation of the wireless headphone within the headphone socket;
- in response to detecting that the orientation of the wireless headphone within the headphone socket is a first orientation, provide a charging signal having a first characteristic; and
- in response to detecting that the orientation of the wireless headphone within the headphone socket is a second orientation, provide a charging signal having a second characteristic.

2. The battery-free charging system recited in claim 1, wherein the wireless headphone is manufactured by Apple.

3. The battery-free charging system recited in claim 1, wherein the second orientation is 180 degrees from the first orientation.

4. The battery-free charging system recited in claim 1, wherein the circuitry is configured to detect the orientation of the wireless headphone within the headphone socket by detecting an input impedance.

5. The battery-free charging system recited in claim 1, wherein the circuitry is configured to adjust at least one of a voltage or a current of a signal provided by the external power source to provide at least one of the charging signal having the first characteristic or the charging signal having the second characteristic.

6. The battery-free charging system recited in claim 1, wherein the circuitry is further configured to adjust at least one of the charging signal having the first characteristic or the charging signal having the second characteristic in accordance with a charging profile.

7. The battery-free charging system recited in claim 1, wherein at least a portion of the circuitry is further configured to conduct an authentication procedure with an external device.

8. The battery-free charging system recited in claim 7, wherein the external device is the wireless headphone.

9. The battery-free charging system recited in claim 7, wherein the external device is a phone, a tablet, or a computer.

10. The battery-free charging system recited in claim 7, wherein the at least a portion of the circuitry comprises an authentication chip, and wherein the authentication chip is configured to conduct the authentication procedure with the external device.

11. A battery-free charging system for charging a pair of wireless headphones, each of the pair of wireless headphones having at least one proprietary electrical contact provided to charge an on-board power source of the wireless headphone, the battery- free charging system comprising:
- a connector for connecting the battery-free charging system to an external power source;
- at least one printed circuit board (PCB) coupled to the connector, the at least one PCB comprising circuitry;
- a cable coupled to the at least one PCB, the cable comprising four wires, a first end of each of the four wires coupled to the at least one PCB;
- a first headphone socket coupled to second ends of first and second wires of the cable; and
- a second headphone socket coupled to second ends of third and fourth wires of the cable, wherein the circuitry comprises:
- a passive circuit configured to detect: (a) a first orientation of a first wireless headphone of the pair of wireless headphones within the first headphone socket, wherein the first wireless headphone is either wireless headphone of the pair of wireless headphones, and (b) a second orientation of a second wireless headphone of the pair of wireless headphones within the second headphone socket, wherein the second wireless headphone is either wireless headphone of the pair of wireless headphones; and
- a controller coupled to the passive circuit and configured to:
  - in response to the detected first orientation, cause a first charging signal having a first charging polarity to be provided to the first wireless headphone via the first and second wires, and
  - in response to the detected second orientation, cause a second charging signal having a second charging polarity to be provided to the second wireless headphone via the third and fourth wires.

12. The battery-free charging system recited in claim 11, wherein the first and second headphone sockets are configured to allow continued use of the first and second wireless headphones while charging.

13. The battery-free charging system recited in claim 11, wherein the controller is further configured to adjust at least one of a voltage or a current of a signal provided by the external power source to provide at least one of the first charging signal having the first charging polarity or the second charging signal having the second charging polarity.

14. The battery-free charging system recited in claim 11, wherein the controller is further configured to adjust a voltage or current of the first charging signal or the second charging signal during a charging cycle.

15. The battery-free charging system recited in claim 11, wherein the passive circuit is configured to detect an input impedance to detect the first orientation of the first wireless headphone within the first headphone socket.

16. The battery-free charging system recited in claim 11, wherein the first and second charging polarities are different.

17. The battery-free charging system recited in claim 11, wherein the circuitry further comprises an authentication chip for authenticating the battery-free charging system.

18. The battery-free charging system recited in claim 11, wherein the circuitry is configured to set at least one of a current or a voltage of the first charging signal depending on a detected characteristic of the first wireless headphone.

19. The battery-free charging system recited in claim 18, wherein the detected characteristic is an identity of a manufacturer of the first wireless headphone or a proxy for the identity of the manufacturer of the first wireless headphone.

20. The battery-free charging system recited in claim 18, wherein the detected characteristic is a characteristic of the at least one proprietary electrical contact.

* * * * *